Nov. 20, 1962    E. C. MULLALLY    3,064,366
GARMENT DISPLAY DEVICE
Filed April 26, 1961
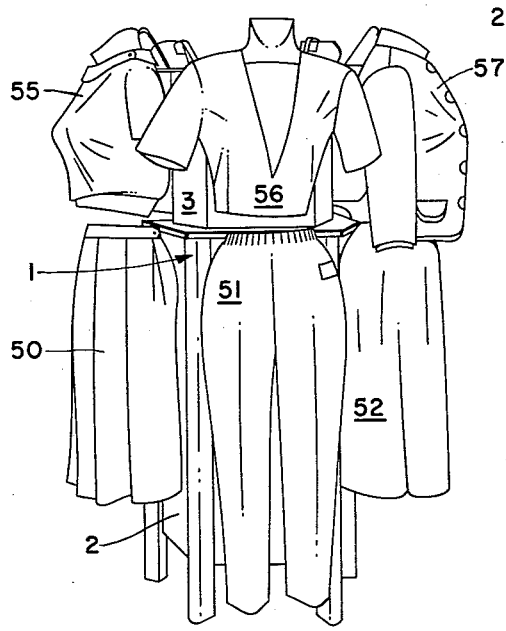
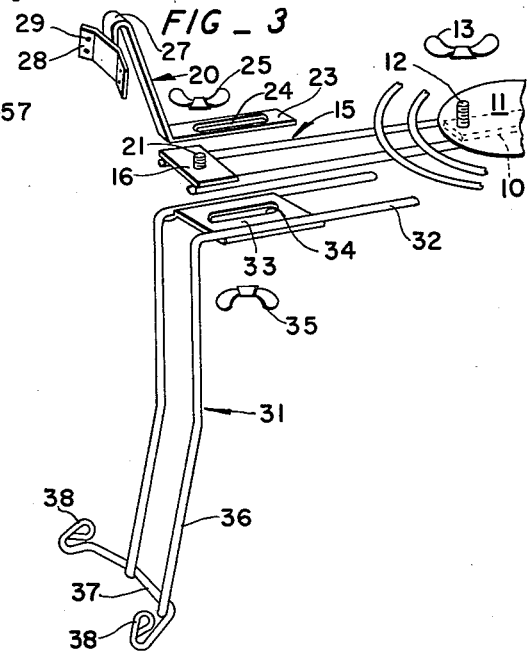
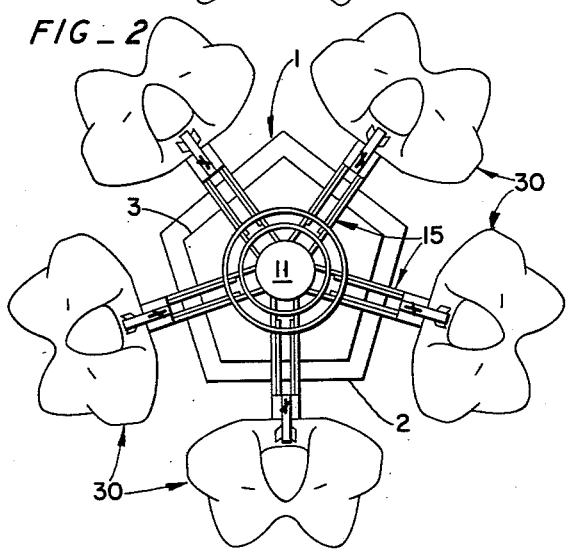
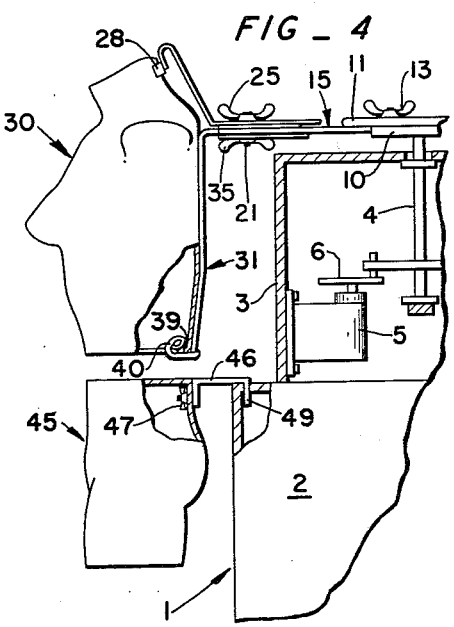
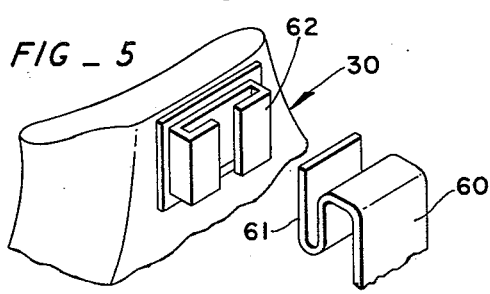
INVENTOR.
EDWARD C. MULLALLY
BY
Boyken, Mohler + Wood
ATTORNEYS 3,064,366
Patented Nov. 20, 1962

3,064,366
GARMENT DISPLAY DEVICE
Edward C. Mullally, 3518 Noriega St.,
San Francisco, Calif.
Filed Apr. 26, 1961, Ser. No. 105,627
5 Claims. (Cl. 35—56)

This invention relates to a display device for garments and more particularly to a device adapted to be employed at the point of purchase in clothing stores for displaying ensembles which include separate upper and lower garments.

Clothing retailers, and especially those dealing in women's wear are faced with the problem of adequately displaying ensembles consisting of upper and lower garments. In view of the fact that one upper garment, for example a blouse, sweater or jacket, may be combined with various types, styles and colors of lower garments such as skirts and shorts to form an ensemble, the retailer has difficulty in demonstrating such garments together in all of the numerous combinations that are possible. For example, one blouse may be combined with various skirts of different colors to form a pleasing outfit and the same blouse may also be worn with various styles and colors of shorts. It is therefore advantageous for the retailer to be able to display such garments together in their many combinations as effectively and efficiently as possible.

It is, therefore, the main object of the present invention to provide a display device adapted to demonstrate to a customer the appearance of the various ensembles possible from two groups of upper and lower garments.

Another object of the invention is the provision of a display device for displaying ensembles in an extremely realistic manner so that the customer may readily see what the true appearance of a particular ensemble will be when worn.

Yet another object of the invention is the provision of a display device which readily lends itself to use with removable mannequin forms and at the same time permits a rugged assembly which is not likely to be damaged by careless handling by sales personnel and customers.

Another object of the invention is the provision of a display device in which a group of upper garments is supported for intermittent movement to positions in which they successively register in superposed relation with lower garments so as to give the viewer a realistic impression of the appearance of the various ensembles when worn, and at the same time allow for adjustment between upper and lower garments to permit such realism to be enhanced as much as possible.

Other objects and advantages will be apparent from the following specification and the drawings.

FIG. 1 is a front elevation of the display device with illustrative garments shown thereon.

FIG. 2 is a top plan view of the device of FIG. 1 with the garments removed.

FIG. 3 is an exploded perspective showing the manner in which the bust form brackets are assembled.

FIG. 4 is a fragmentary vertical section through the device showing the manner in which the mannequin forms are secured to the standard.

FIG. 5 is a fragmentary perspective showing a modified form of bust form bracket.

The invention will be described with respect to the display of women's garments, but it will be understood that it is equally applicable to men's and children's clothing.

In detail and with reference first to FIGS. 1, 2, the invention comprises a central standard generally designated 1 which may take any convenient form depending on the design effect desired. In the drawings the standard 1 is shown composed of two main parts, a base portion 2 and an upper portion 3 having a somewhat smaller cross sectional extent than the base portion. Both the base 2 and the upper portion 3 are illustrated in the drawing as having five sides, but it will be apparent that they may be cylindrical, square, hexagonal or any other desired shape. The pentagon shape of standard 1 is believed to be most desirable since it is convenient for the retailer to display five groups of upper garments and five groups of lower garments thus making twenty-five different ensembles.

Within the upper portion 3 of standard 1 and extending upwardly therefrom is a vertically extending shaft 4 which is rotatably supported in suitable bearings and driven from a motor reducer 5 through a Geneva movement 6. Such a movement 6 is for the purpose of rotating shaft 4 at a predetermined speed and to make such rotation intermittent so that the upper garment of an ensemble will remain stationary relative to the lower garment for a predetermined interval of time to permit the viewer to see the effect given by the combination. The particular means employed for driving shaft 4 is therefore not critical and is not claimed herein except in combination with the remainder of the invention.

Fixedly secured to the upper end of shaft 4 is a plate 10 which is adapted to carry the support for the upper garment forms. Said support includes a central plate 11 which is adapted to overlie plate 10 and be removably secured thereto by studs 12 and nuts 13. Rigidly secured to plate 11 as by welding are a plurality of radiating arms 15 which may be conveniently formed of heavy wire and which are each provided with an end plate 16 at their distal ends. As best seen in FIG. 3 a bust form bracket generally designated 20 is secured to the outer end of each arm 15 by means of a stud 21 which is rigidly secured intermediate its ends to plate 16 of arm 15 and is provided with threaded portions extending outwardly of said plate 16.

Bust form bracket 20 is formed with a horizontally extending portion 23 which is provided with an elongated slot 24 for receiving the upper end of stud 21 therethrough. A wing nut 25 is employed to fixedly but releasably secure bracket 20 to arm 15. It will be noted that the adjustment provided by elongated slot 24 permits the bracket 20 to be moved toward and away from arm 15 to permit proper positioning of the upper garment relative to the lower garment.

Bracket 20 extends slantingly upwardly and outwardly relative to horizontal portion 23 and is provided with an inverted U-shape portion 27 to which is secured a form securing plate 28. This plate 28 may be provided with a plurality of holes 29 through which rivets may be passed for permanently securing bust form 30 thereto.

As best seen in FIG. 4 bust form 30 is hollow and may be formed of pliable plastic and is preferably closed at the top and open at the bottom. The open bottom permits the fabricator to reach through the same while riveting or otherwise securing the bust form to plate 28. The bust form 20 is, in effect, a thin plastic shell, and this is desirable since it is readily handled and dressed. However, in view of the danger of the bust form becoming damaged, for example by a customer holding the same when it starts to move, it is extremely important to secure the form in place relative to the arm 15 and at the same time permit the form to be dressed. This is achieved by a lower bracket generally designated 31 which is provided with a horizontally extending portion 32 including plate 33. Said plate 33 is provided with an elongated hole 34 for receiving therethrough the lower end of stud 21 to permit adjustable securement of bracket 31 by means of wing nut 35.

Lower bracket 31 also includes a generally vertically extending portion 36 which terminates at its lower end in a cross piece 37 which may be welded to portion 36. Cross piece 37 terminates in a pair of clips 38 which define yieldable jaws for receiving therein the lower margin portion 39 of bust form 30 (FIG. 4). Since clips 38 are spaced apart across the back of the bust form 30 it will be apparent that a sturdy three point support is thereby provided. At the same time it will be apparent that the bust form is readily removed and dressed and easily replaced. It will also be noted from FIG. 4 that lower bracket 31 does not interfere in any way with whatever garment is carried by said bust form.

The hip forms 45 may be stationarily secured in any desired manner to the base portion 2 of standard 1. By way of example in FIG. 4 a slip 46 is shown secured to the hip form 45 by means of a stud on the clip and a wing nut 47 which may be reached through one of the leg openings in the hip form 45. The upper side of base portion 2 of standard 1 may be provided with a pair of apertures for receiving two downwardly projecting end portions 49 of clips 46. By securing clip 46 to the hip form 45 adjacent the upper closed side of the latter the form may readily be dressed and then mounted on standard 1.

By the above described structure five hip forms 45 may be mounted on the base portion 2 of standard 1 and said forms may be dressed with lower garments such as skirt 50, slacks 51 and skirt 52 shown in FIG. 1 and whatever other garments may be desired on the remaining two hip forms not seen in FIG. 1. Similarly the five bust forms 30 may be dressed with five different upper garments including, for example, blouses 55, 56 and jacket 57.

The motor reducer 5 and the Geneva movement 6 may be arranged to rotate shaft 4 at any desired speed, say for example, about six revolutions per minute which, in the case of five mannequins, would permit each ensemble to be viewed for slightly less than two seconds. It will be apparent that the speed of the device may be increased or reduced as desired.

The particular bracket structure employed and illustrated in FIG. 3 is extremely important because it not only provides an extremely stable support for the bust form but also allows for adjustment of the bust form to the exact position that displays the ensembles to greatest advantage. Since the hip forms are stationary and their positions dictated by the clips 46, the bust forms may be shifted toward and away from the standard 1 to suit whatever upper garment is being displayed. As an example, blouse 55 cooperates with skirt 50 in such a way that the front portion of the blouse form may be directly above the front portion of the hip form. On the other hand the jacket 57 (FIG. 1) is shown to greatest advantage when permitted to overhang the front of the hip forms. In this latter case it is necessary that the bust form for jacket 57 be adjustably moved away from standard 1 until the front of jacket 57 clears the front of skirt 52 and the other garments on lower hip forms 45 so that when the device is rotated there will be no interference between jacket 57 and the lower garment forms. The sides of jacket 57 may, of course, be pinned up or otherwise arranged to insure clearance when the device rotates.

It will be understood that one of the greatest advantages of the device lies in the realism which may be achieved. For this reason it is essential that the bust forms be supported to permit the above-described adjustment.

It will be noted that the adjustability of the above-described structure does not interfere with, nor does it make more difficult, the dressing of the garment forms and it is a simple matter for a person to remove a bust form, dress it, and replace it in its correct position.

If desired, the bracket 20 may be replaced by a bracket 60 such as indicated in FIG. 5 which is provided at its free outer end with a fitting 61 adapted to be received in a complementarily formed socket member 62 fixedly secured to bust form 30. In such a case the bust form may be removed from its brackets by pulling upwardly and outwardly on the form and it may be replaced in the reverse manner. However, since adjustment of the bust form relative to the standard 1 is usually required, the less expensive construction of FIG. 3 is preferred.

The above specifically described preferred form of the invention should not be taken as restrictive of the invention as it will be apparent that various modifications in design may be resorted to without departing from the scope of the following claims.

I claim:

1. A garment display device for displaying ensembles that include upper and lower garments comprising: a central standard, a lower group of garment forms arranged at spaced points around said standard and adapted to be dressed with such lower garments, means for supporting said lower forms in fixed spaced apart relationship relative to said standard, an upper group of garment forms arranged at spaced points around said standard and above said lower forms and adapted to be dressed with upper garments, means for supporting said upper forms in fixed spaced apart relationship relative to said standard, and means for rotating one of said groups of forms to bring each upper garment form into superposed relation successively with each of said lower garment forms.

2. A garment display device for displaying ensembles that include upper and lower garments comprising: a central standard, a lower group of garment forms arranged at spaced points around said standard and adapted to be dressed with such lower garments, means for supporting said lower forms in fixed spaced apart relationship relative to said standard, an upper group of garment forms arranged at spaced points around said standard and above said lower forms and adapted to be dressed with upper garments, means for supporting said upper forms in fixed spaced apart relationship relative to said standard, and means for rotating one of said groups of forms to bring each upper garment form into superposed relation successively with each of said lower garment forms, and means for automatically stopping said last mentioned means for holding said forms in superposed relation for an interval of time.

3. A garment display device comprising: a central standard, means for supporting a plurality of hip forms on said standard fixed spaced apart relationship around the latter, a vertically extending rotatably mounted support on said standard, means for supporting a plurality of bust forms in fixed spaced apart relationship on said support at spaced points around said standard and above said hip forms, whereby each of said bust forms is brought into superposed relation relative to said hip forms upon rotation of said support.

4. In a garment display device that includes a pair of upper and lower garment forms with one of said forms being mounted on a rotatable support relative to the other, power means for so rotating said support, means for detachably securing said one form to said support comprising: a bracket secured at one end to said one form and at its other end to said support, interengaging elements on said other end and said support to permit said bracket to be shifted toward and away from said support and relative to the other form to permit proper registration of said upper and lower forms to suit the garments thereon.

5. In a garment display device that includes a pair of upper and lower garment forms with one of said forms being mounted on a rotatable support relative to the other, power means for so rotating said support, means for detachably securing said one form to said support comprising: a bracket secured at one end to said one form and at its other end to said support, interengaging elements on said other end and said support to permit said bracket to be shifted toward and away from said support and relative to the other form to permit proper registration of said upper and lower forms to suit the garments thereon, and quick detachable means connecting said one form to said bracket for so securing said bracket to said one form.

References Cited in the file of this patent

UNITED STATES PATENTS

| | | |
|---|---|---|
| 506,223 | Gold | Oct. 10, 1893 |
| 602,195 | Pfau | Apr. 12, 1898 |
| 1,469,653 | Jankus | Oct. 2, 1923 |
| 1,502,457 | Brecker | July 22, 1924 |
| 2,304,658 | Sanford | Dec. 8, 1942 |
| 2,897,608 | Langendorf | Aug. 4, 1959 |